Aug. 13, 1968   M. E. REED   3,396,771

DETACHABLE SNOW TREAD

Filed Sept. 29, 1966

INVENTOR
MYLES E. REED

United States Patent Office 3,396,771
Patented Aug. 13, 1968

3,396,771
DETACHABLE SNOW TREAD
Myles E. Reed, 626½ 14th St.,
Huntington, W. Va. 25701
Filed Sept. 29, 1966, Ser. No. 582,974
1 Claim. (Cl. 152—175)

ABSTRACT OF THE DISCLOSURE

A jacket enclosing the outer periphery and sides of an automobile tire, the jacket incorporating a snow tread, the jacket comprising a circular member having a radial opening so as to allow insertion over an automobile tire, the jacket ends being connected together by constant length connection means in order to prevent the jacket ends from expanding apart due to centrifugal force when an automobile is in travel motion.

---

This invention relates generally to automobile tires. More specifically, it relates to treads which are attachable to automotive tires.

A principal object of the present invention is to provide a detachable snow tread having self-contained means for being attached over an automobile tire so as to convert the tire for use upon ice or snow.

Another object of the present invention is to provide a detachable snow tread which can be fitted over the peripheral edge of a conventional tire and which is provided with chain means for securing the tread in operative position.

Yet another object of the present invention is to provide a detachable snow tread which comprises a generally circular member that is open fully across at one point so that the same may be readily inserted upon a tire.

Another object of the present invention is to provide a detachable snow tread which is simple in design, inexpensive to manufacture, rugged in construction, easy to use and efficient in operation.

These and other objects will be readily evident upon a study of the following specification and the accompanying drawing wherein.

Figure 1:
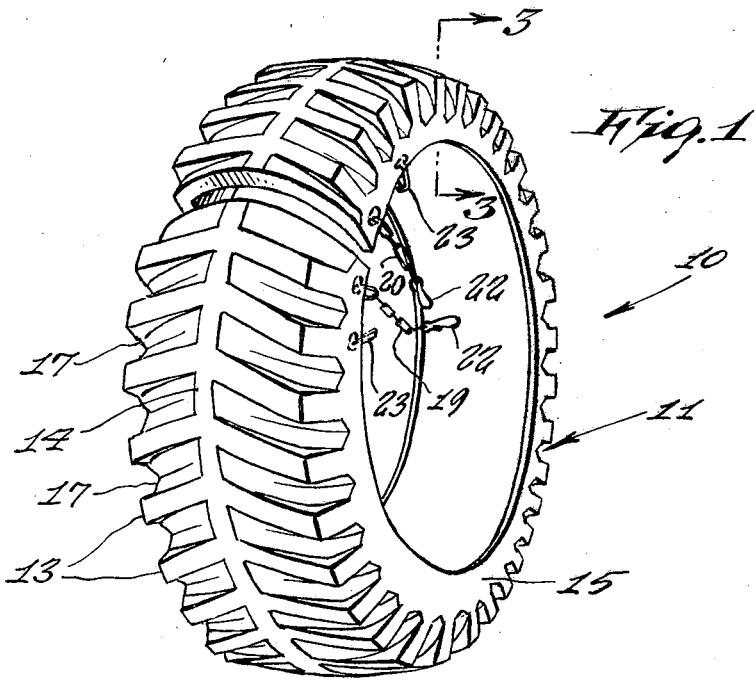
FIGURE 1 is a perspective view of the present invention.

Referring now to the drawing in detail, the numeral 10 represents a detachable snow tread according to the present invention wherein there is a generally circular member 11 formed principally from material such as is used in the manufacture of conventional tires. Such materials comprise principally a good quality rubber and may include several layers or plies of cord immediately below the outer periphery thereof so as to provide strength to the device.

A detachable snow tread includes a convex outer periphery 12 on which there are a plurality of tread teeth 13 which may be of any design, as preferred by a manufacturer, and which also include a central peripheral bead or rib 14 which extends around the tread. The member 11 further includes opposite side walls 15 and a concave inner wall 16. A plurality of depressions 17 are formed between the tread teeth 13 for the purpose of providing traction when the device is mounted upon a tire.

Figure 2:
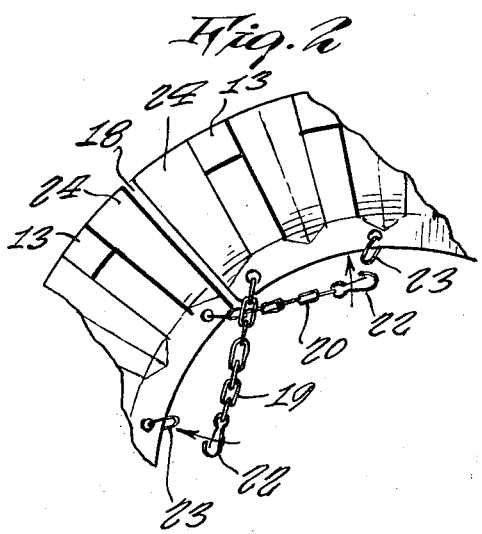
FIGURE 2 is an enlarged fragmentary side elevation view showing how the ends of the tire are secured together in operative position.
Figure 3:
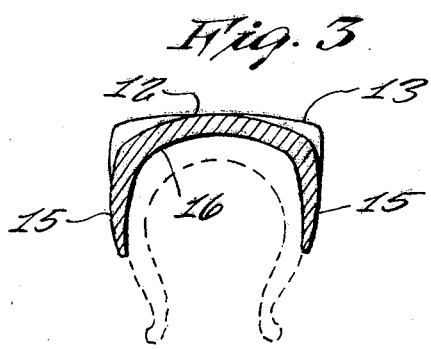
FIGURE 3 is a cross sectional view taken on the line 3—3 of FIGURE 1.

As shown in FIGURES 1 and 2, the member 11 is provided with a radially extending slot 18 which cuts through the device so that it forms an open ring. The slot 18 is provided for the purpose of allowing the tire to receive the tread.

A pair of chains 19 and 20 are molding at their one ends within the rim 21 of the tread and are provided at their opposite ends with snap hooks 22. A chain link 23 is also molding into the rim of the tread and is for the purpose of being engaged by the snap hooks 22 as is clearly indicated in FIGURE 2 of the drawing.

It is to be noted that the recess areas 17 between the tread teeth 13 are of a configuration whereby ice and snow will not build up between the teeth due to the sidewardly outward slope of the surface thereof, thus causing ice or snow formed therein to be pushed sidewardly outward from the recesses. These recesses in a cross-section are of V-shaped configuration.

In operative use the detachable snow tread is spread and fitted over a conventional automobile tire after which the ends 24 are drawn together and the chains 19 and 20 are pulled tightly so that the snap hook 22 at one end 24 is received within the link 23 upon the opposite end 24 as shown in FIGURE 2 of the drawing. The tread thus secured with both chains 19 and 20 is frictionally secure upon the tire so that the same may be used with complete safety while traveling over ice and snow. The relatively improved tread design will afford the motorist a better protection against being stopped within the snow than is possible by his own conventional tires.

I claim:

1. In a detachable snow tread, the combination of a circular member made preferably from material similarly used in construction of automobile tires, said material comprising rubber and several plies of cord, said member being of circular configuration and including a cross sectionally convex outer peripheral side, a concave inner side, a sidewall on each side of said tread, said sidewalls defining rims, said member having a radially extending slot thereacross so that said member forms an open ring and having an end adjacent each side of said slot, said member having self contained, constant length means for connecting said ends together, said means for connecting said ends together comprising a pair of chains, one end of each of said chains being molded within said rim, the opposite end of each of said chains having a snap hook thereupon, a link molded in said rim adjacent each said end, and said snap hook of one said chain being engageable with the link on the rim of the other said end, said engagement of said snap hooks and links comprising said means for securing said tread upon said tire, said securing means being of constant length so as to prevent contraction or expansion thereof, said ends accordingly remaining a fixed distance apart during operative use, and said outer convex side of said member comprising a plurality of spaced apart teeth and a recess between each of said teeth, each of said recesses being triangular in configuration to prevent the formation and build up of snow therewithin.

References Cited

UNITED STATES PATENTS

| | | | |
|---|---|---|---|
| 1,062,070 | 5/1913 | Wilcox | 152—175 |
| 1,382,045 | 6/1921 | Zizler | 152—213 |
| 1,515,287 | 11/1924 | Szpak | 152—219 |
| 2,113,066 | 4/1938 | Hoover | 152—209 |
| 2,403,309 | 7/1946 | Smith | 152—209 |
| 2,753,912 | 7/1956 | Mallow | 152—175 |
| 2,948,318 | 9/1960 | Firestone | 152—175 |

ARTHUR L. LA POINT, Primary Examiner.

C. B. LYON, Assistant Examiner.